United States Patent Office 3,312,116
Patented Apr. 4, 1967

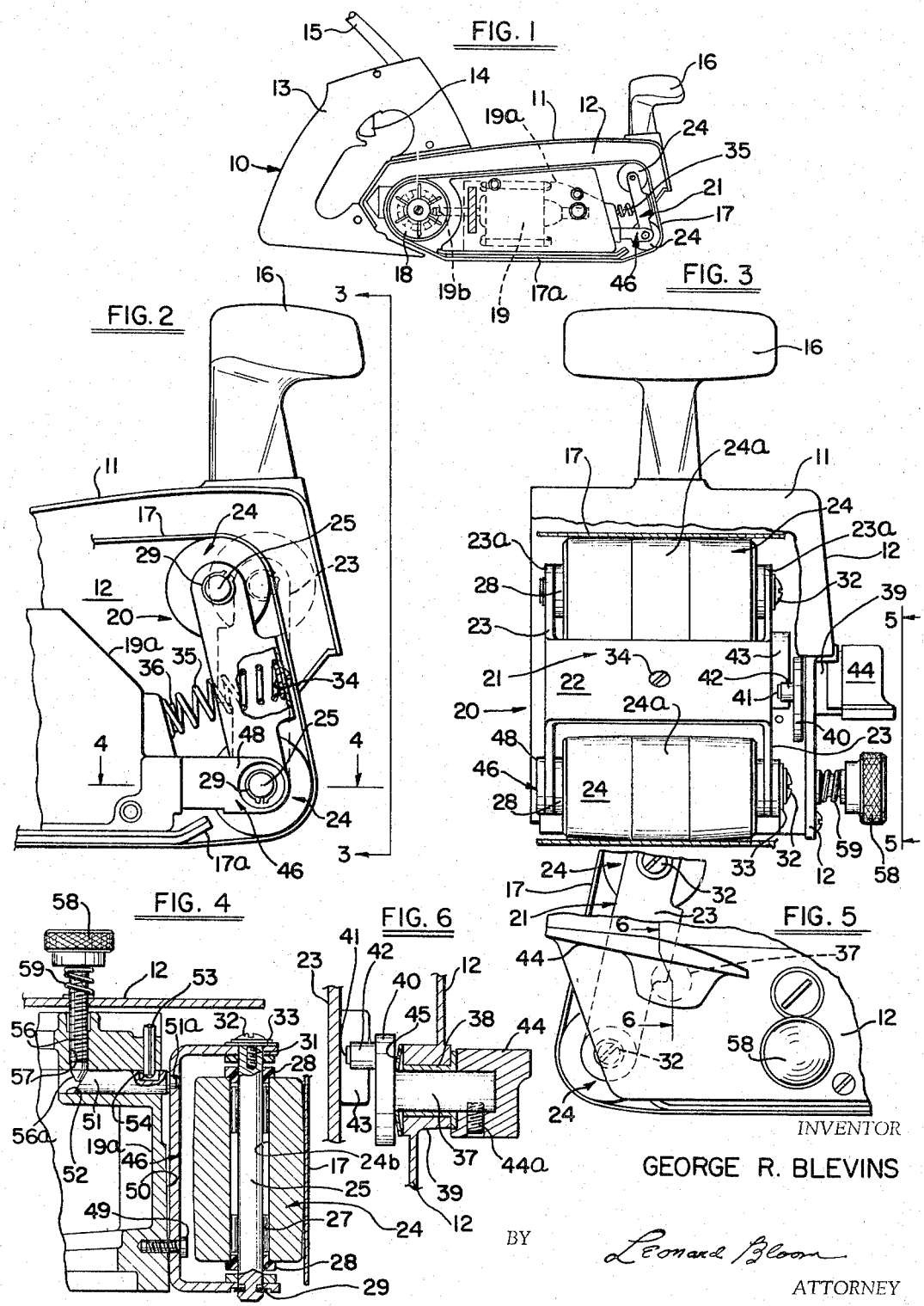

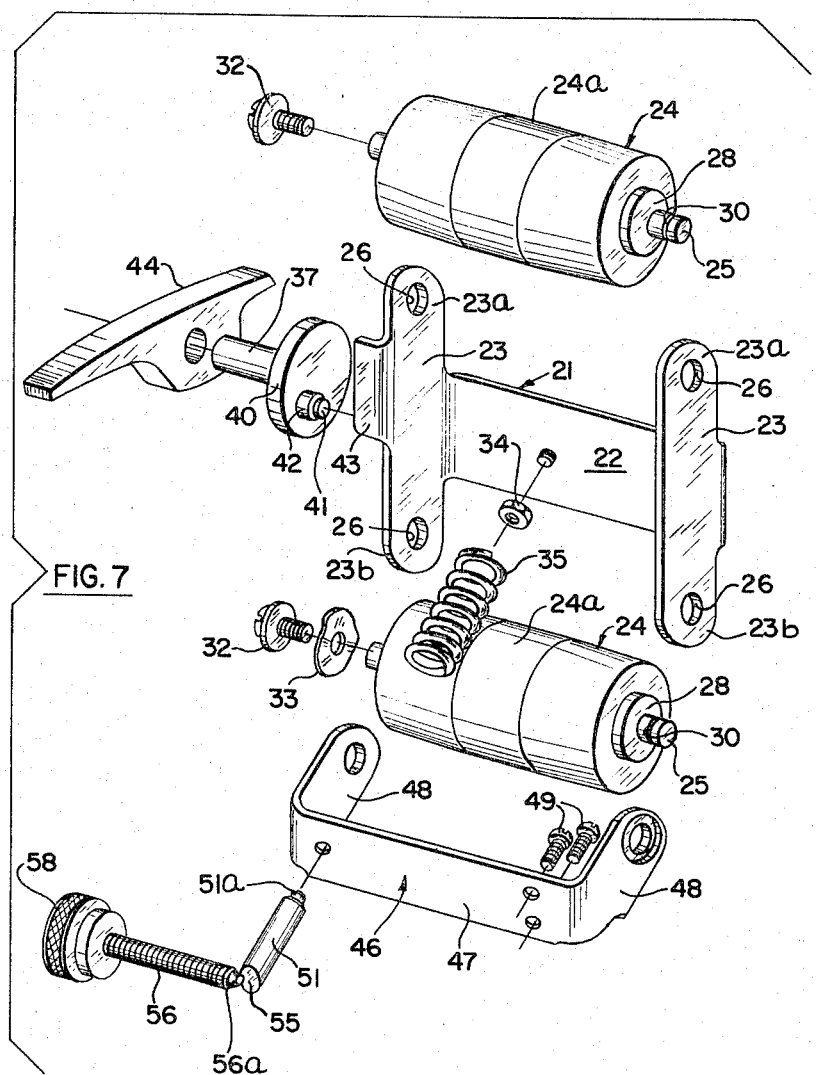

3,312,116
GUIDING PULLEY MEANS FOR
BELT SANDER
George R. Blevins, Baltimore County, Md., assignor to
The Black and Decker Manufacturing Company, Towson, Md., a corporation of Maryland
Filed Apr. 12, 1965, Ser. No. 447,317
5 Claims. (Cl. 74—240)

The present invention relates to a guiding pulley means for a belt sander or similar tool adapted for abrading, polishing, or burnishing operations, and more particularly, to a compact and efficient guiding pulley means for a tool in which the motor is disposed directly within the belt.

The present invention finds particular utility in conjunction with a compact belt sander which generally comprises a housing, an endless belt within the housing, a motor in a frame within the belt, and a driving pulley within the belt and driven by the motor.

The present invention constitutes an improvement in the guiding pulley means for the belt, and the basic object of this improvement is to provide a guiding pulley means comprising a pair of guiding pulleys, each of which has a smaller diameter than that of the driving pulley. The pair of guiding pulleys are mounted conjointly for a simultaneous movement within the belt, and thus function in unison as a unitary guiding pulley means for the belt.

In accordance with the broad teachings of the present invention, there is herein illustrated and described, a guiding pulley support means within the belt, which support means is disposed at the opposite end of the motor frame in relationship to the driving pulley. The guiding pulley support means has a pair of guiding pulleys rotatably mounted thereon along respective substantially-parallel axes which are transverse to the belt travel, with the guiding pulleys being of substantially smaller diameter than the driving pulley. The guiding pulley support means is constantly urged away from the motor frame, and hence the guiding pulleys are constantly urged into engagement with the belt, and means are provided to selectively retract the guiding pulley support means away from the belt. A "tracking" means is further provided to simultaneously aline the respective axes of both guiding pulleys with respect to the belt—the guiding pulleys are conjointly mounted upon the support means—and hence every movement that occurs in one of the guiding pulleys simultaneously occurs in the other guiding pulley. In such a manner, the guiding pulleys operate in unison as a unitary guiding means for the belt.

This structural arrangement and its operation allows a "three-pulley" system to be used in the manner of a "two-pulley" system and to have all of the advantages pertaining thereto. A two-pulley system will generally "track" better than a three-pulley system, that is, the belt is more evenly guided and follows the pulleys more closely in a two-pulley system, yet a three-pulley system is often required because of space and motor power considerations. The improvement of the present invention combines the best features of both systems, and accordingly, several important results are obtained: one, a standard-sized widely-popular belt, such as a 3 x 24 inch nominal size, is used; two, the belt has good tracking characteristics under a variety of operating requirements; three, the guiding pulley means occupies a relatively small space within the belt, and the motor frame (which is within the belt) occupies a proportionally greater space and hence accommodates a more powerful motor; four, the overall tool is thus more powerful and has a relatively-high work removal rate, one which compares quite favorably with (and in a good many cases exceeds) that of competitive commercial units which have the motor on top of the housing in a bulky, unwieldly arrangement; and five, the overall tool of the present invention is compact, easy to operate, has a smooth and pleasing appearance, is well balanced, and doesn't tend to "crawl" along the work or to oppose the operator's convenient control.

In accordance with the specific teachings of the present invention, the guiding pulley support means includes a bracket within the belt, with the bracket and the driving pulley being disposed in relationship to each other at opposite ends of the motor frame. The bracket has a main body portion and a pair of substantially-parallel side flange portions, each having respective ends projecting above and below the body portion. A pair of guiding pulleys—comprising an upper guiding pulley and a lower guiding pulley—are mounted in the respective ends of the side flanges of the bracket. The guiding pulleys have respective substantially-parallel axes transverse to the belt travel, and the guiding pulleys project forwardly beyond the body portion of the bracket into engagement with the belt. Means are provided to support the bracket for a limited movement towards and away from the belt, and this means includes means to adjust the bracket and to aline the respective axes of both guiding pulleys in unison with respect to the belt travel, whereby both guiding pulleys function as a unitary guiding pulley means for the belt. Resilient means constantly urges the bracket away from the motor frame, thereby urging both guiding pulleys into engagement with the belt, and means are provided to selectively retract the bracket and at least one of the guiding pulleys away from the belt.

In accordance with the further teachings of the present invention, the supporting means for the bracket includes a U-shaped member having respective legs which straddle the respective lower ends of the side flanges of the bracket, with the bracket having a pivot axis which coincides substantially with the axis of the lower guiding pulley. In addition, one of the side flanges of the bracket has an integral tab portion bent at substantially right angles thereto, and a crank mechanism carried by the housing has a roller in engagement with the tab portion of the bracket to selectively retract the bracket away from the belt. Moreover, and preferably, the guiding pulleys are identical to teach other for increased economy of manufacture.

These and other objects of the present invention will become apparent from a reading of the following specification, taken in conjunction with the enclosed drawings, in which:

FIGURE 1 is a side elevation of the overall belt sander with the motor and its associated gearing, which are disposed within the belt, being shown in broken lines;

FIGURE 2 is an enlarged fragmentary portion of FIGURE 1, showing the improvement in the guiding pulley means of the present invention;

FIGURE 3 is a front elevation thereof, taken along the lines 3—3 of FIGURE 2;

FIGURE 4 is a transverse section, taken along the lines 4—4 of FIGURE 2, and showing the means to aline the axes of both guiding pulleys with respect to the belt;

FIGURE 5 is a fragmentary elevation of the opposite side of the housing, the view being taken along the lines 5—5 of FIGURE 3;

FIGURE 6 is a section view, taken along the lines 6—6 of FIGURE 5, and showing the crank mechanism to retract the bracket; and FIGURE 7 is an exploded perspective of the major components of the improved guiding pulley means of the present invention.

With reference to FIGURE 1, there is illustrated a compact belt sander 10 which incorporates the teachings of the present invention. This unit generally comprises a housing 11 including a side wall 12, an end handle 13 including a trigger switch 14 for energizing the unit from an electric line 15, a front handle 16 to facilitate manual control of the unit, an endless belt 17 within the housing disposed to one side of the side wall, a platen 17a engaging the belt, a driving pulley 18 for the belt, a motor 19 within a motor frame 19a disposed within the belt, and suitable gearing, denoted as at 19b, for driving the pulley from the motor.

With reference to the remaining drawings, there is illustrated in detail the guiding pulley means 20 of the present invention. This guiding pulley means 20 includes a bracket 21 disposed at the opposite end of the motor frame in relationship to the driving pulley. The bracket 21 has a main body portion 22 and a pair of substantially-parallel side flanges 23, see FIGURE 7, and each flange 23 has respective ends 23a and 23b projecting above and below the body portion of the bracket.

A pair of guiding pulleys 24 are mounted between the respective ends of the side flanges 23 of the bracket 21. Preferably, but not necessarily, the pulleys 24 are identical to one another and are provided with an intermediate crowned portion 24a to assist in the guidance and alinement of the belt. The pulleys 24 are mounted identically to one another; and as shown in FIGURE 4, each pulley has a bore 24b with an axle 25 disposed within the bore. Each axle 25 is mounted (preferably with a rotatable fit) within apertures 26 formed in the respective ends 23a and 23b of the bracket flanges 23. A roller bearing 27 is disposed at each end of the pulley 24 for rotatably journaling the pulley on its respective axle 25. Also, a bearing bushing 28, preferably molded from a suitable plastic material, is disposed in each end of the bore of the pulley 24 axially of its respective bearing 27 so as to provide a suitable seal. The respective ends of the axle 25 project beyond the respective bracket flanges 23. One of the axle ends has a snap ring 29 in an annular groove 30 to form an abutment shoulder. The other end of the axle 25 has a tapped recess 31 which receives a headed washer-type of screw 32 for retaining the axle with respect to the bracket 21. Preferably, a resilient washer 33 is disposed between the respective bracket flange 23b and the head of its associated screw 32 for a purpose hereinafter described.

The body portion 22 of the bracket 21, see FIGURE 2, carries a screw and nut 34 centrally thereof so as to seat one end of a coiled compression spring 35, the opposite end of which is piloted on a stud 36 on the forward portion of the motor frame 19a. This provides a resilient means for constantly urging the bracket 21 away from the motor frame, thereby urging both guiding pulleys 24 into engagement with the belt 17, and is referred to in the art as the "tensioning" means for the belt.

With particular reference to FIGURES 5, 6, and 7 the means to selectively retract the bracket 21 and both guiding pulleys 24 away from the belt (in opposition to the spring 35) comprises the following structure: a shaft 37 is journaled in a bearing bushing 38 retained within a boss 39 formed in the side wall 12 of the housing. The inward portion of the shaft 37 is radially enlarged, as at 40, and carries a crank pin 41 and a roller 42 for engagement with a tab portion 43 formed integrally with one of the side flanges 23 of the bracket 21 and bent substantially at right angles thereto. The opposite end of the shaft 37 carries a lever 44 secured by means of a set screw 44a; and preferably, a resilient washer 45 is disposed between the radially-enlarged portion 40 of the shaft 37 and the boss 39 of the side wall 12. Rotation of the lever 44 (and hence the shaft 37 and crank pin 41) causes the roller 42 to engage the tab portion 43 and to retract the entire bracket 21 and the guiding pulleys 24 away from the belt against the force of the spring 35. This enables the belt 17 to be removed from the tool.

Preferably, the movement of the bracket 21 comprises a pivotal movement about the axis of the lower guiding pulley 24. The broken lines in FIGURE 2 illustrate the movement of the bracket 21 and the upper guiding pulley 24 (under the force of the spring 35) after the belt 17 has been removed.

Any suitable "tracking" means may be used to aline the respectives axes of both guiding pulleys 24 simultaneously with respect to the belt 17, but the preferred tracking means is as follows: a U-shaped member 46 (in the nature of a bracket) has a base portion 47 and a pair of substatially-parallel legs 48. The legs 48, see FIGURE 4, straddle the lower ends 23b of the flanges 23 of the main bracket 21 and are retained between the flanges 23 by means of the screw 32. A pair of screws 49 secures one end of the base 47 of the member 46 to the motor frame 19a. The front face 50 of the motor frame 19a (or equivalent portion of the housing) is inclined in a direction which diverges away from the screws 49 as shown in FIGURE 4. The member 46, and particularly its base portion 47, has a degree of inherent resiliency, so that the member 46 tends to spring back towards the inclined face 50 of the motor frame 19a in a direction substantially about the screws 49 as a vertical pivot axis. With the member 46 thus being constantly urged towards the inclined face 50, opposing means is provided to move the member 46 (and hence the guiding pulley means 20 of the present invention) away from the inclined face 50 of the motor frame 19a Preferably, this opposing means includes a wedge 51 slidably mounted within a recess formed in the motor frame 19a. The wedge 51 has a pilot portion 51a in engagement with the base 47 of the member 46. The sliding movement of the wedge 51 in the recess 52 is limited by means of a pin 53 retained in the motor frame 19a and received within a slot 54 formed within the wedge 51. The inward face of the wedge 51 is inclined or tapered, as at 55, and is adapted to engage a pilot portion 56a of a screw 56. The screw 56 is threaded into a tapped recess 57 in the motor frame 19a and extends beyond the side wall 12 of the housing. The screw 56 carries a knurled adjusting knob 58, and a coiled spring 59 is preferably disposed between the knob 58 and the side wall 12. When the screw 56 is advanced into the housing, the wedge 51 will be advanced forwardly in its engagement with the base 47 of the U-shaped member 46, in opposition to the inherent resiliency of the member 46, and hence will "pivot" the member 46 about the vertical axis of the securing screws 49. By "pivot," it is understood that a portion of member 46 will deflect approximately about the vertical line connecting the centers of the bores (in member 46) through which the screws 49 pass.

Since the bracket 21 is supported upon the legs 48 of the U-shaped member 46, the pivotal movement of the member 46 will be imparted to the bracket 21, and from the bracket 21, to the guiding pulleys 24 of the present invention. In such a manner, the respective axes of the guiding pulleys 24 will be adjusted or alined with respect to the travel of the belt 17; and since the guiding pulleys 24 are conjointly mounted as previously described, their respective axes will be alined simultaneously for conjoint tracking of the belt.

The purpose of the resilient washer 33 is to take up the "slack" along the axle 25 between the headed screw 32 and the respective bracket flange 23b whenever the U-shaped member 46 is pivoted forwardly and is constrained so that its legs 48 are brought closer together.

The preferred tracking means herein described forms no part of the present invention, but is claimed in the co-pending McCarty et al. application Ser. No. 449,983, filed Apr. 22, 1965. Entitled "Tracking Means for Belt Sander," and assigned to the assignee of the present invention.

Obviously, many modifications may be made without departing from the basic spirit of the present invention; and accordingly, within the scope of the appended claims, the invention may be practiced other than has been specifically described herein.

I claim:

1. In an abrading tool comprising a housing, an endless belt within the housing, a motor in a frame within the belt, and a driving pulley within the belt and driven by the motor; the improvement in guiding pulley means for the belt, which comprises:
   (a) a bracket within the belt; said bracket and the driving pulley being disposed in relationship to each other at opposite ends of the motor frame;
   (b) said bracket having a main body portion and a pair of substantially-parallel side flange portions each having respective ends projecting above and below said body portion;
   (c) a pair of guiding pulleys comprising an upper guiding pulley and a lower guiding pulley mounted in said respective ends of said side flanges of said bracket;
   (d) said guiding pulleys having respective substantially-parallel axes transverse to the belt travel, and said guiding pulleys projecting forwardly beyond said body portion of said bracket into engagement with the belt;
   (e) means supporting said bracket for limited movement towards and away from the belt;
   (f) said means supporting said bracket including means to adjust said bracket and to aline the respective axes of both guiding pulleys, in unison, with respect to the belt travel, whereby both guiding pulleys function as a unitary guiding pulley means for the belt;
   (g) resilient means constantly urging said bracket away from the motor frame, thereby urging both guiding pulleys into engagement with the belt; and
   (h) means to selectively retract said bracket and said guiding pulleys away from the belt.

2. The improvement of claim 1, wherein:
   (a) said means supporting said bracket comprises a pivotal supporting means having an axis coinciding substantially with the axis of said lower guiding pulley; and wherein:
   (b) said means supporting said bracket includes a U-shaped member having respective legs which straddle said respective lower ends of said side flanges of said bracket.

3. The improvement of claim 1, wherein:
   (a) one of said side flanges of said bracket has an integral tab portion bent at substantially right angles thereto; and wherein:
   (b) said means to selectively retract said bracket comprises a crank mechanism carried by the housing and including a roller in engagement with said tab portion of said bracket.

4. In an abrading tool comprising a housing, an endless belt within the housing, a motor in a frame within the belt, and a driving pulley within the belt and driven by the motor; the improvement in guiding pulley means for the belt, which comprises:
   (a) guiding pulley support means within the belt disposed at the opposite end of the motor frame in relationship to the driving pulley;
   (b) a pair of guiding pulleys rotatably mounted upon said guiding pulley support means on respective axes which are substantially parallel to one another and transverse to the belt travel;
   (c) means constantly urging said guiding pulley support means away from the motor frame, thereby urging said guiding pulleys into engagement with the belt;
   (d) means to selectively retract said guiding pulley support means and said guiding pulleys away from the belt; and
   (e) means to simultaneously aline the respective axes of both guiding pulleys with respect to the belt, whereby said guiding pulleys operate in unison as a unitary guiding pulley means for the belt.

5. The improvement of claim 4, wherein:
   (a) said guiding pulleys are substantially identical to each other and are of substantially smaller diameter than said driving pulley.

References Cited by the Examiner

UNITED STATES PATENTS

| 2,282,658 | 5/1942 | Kneisley | 51—170 |
| 2,696,123 | 12/1954 | Swan | 74—242.11 |
| 2,761,256 | 9/1956 | O'Conner | 51—170 |
| 2,976,652 | 3/1961 | Bedortha et al. | 51—170 |

DAVID J. WILLIAMOWSKY, *Primary Examiner.*

J. A. WONG, *Assistant Examiner.*